(12) United States Patent
Hayashi et al.

(10) Patent No.: US 11,292,976 B2
(45) Date of Patent: Apr. 5, 2022

(54) SLAG DISCHARGE SYSTEM, GASIFIER, AND SLAG FILTRATION METHOD

(71) Applicant: MITSUBISHI HITACHI POWER SYSTEMS, LTD., Yokohama (JP)

(72) Inventors: Tomoya Hayashi, Yokohama (JP); Masato Murayama, Yokohama (JP); Yoshinori Koyama, Tokyo (JP); Naoshige Yoshida, Yokohama (JP); Yasuyuki Miyata, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 677 days.

(21) Appl. No.: 16/096,075

(22) PCT Filed: Mar. 29, 2017

(86) PCT No.: PCT/JP2017/012830
§ 371 (c)(1),
(2) Date: Oct. 24, 2018

(87) PCT Pub. No.: WO2017/199591
PCT Pub. Date: Nov. 23, 2017

(65) Prior Publication Data
US 2021/0222077 A1   Jul. 22, 2021

(30) Foreign Application Priority Data

May 16, 2016 (JP) .............................. JP2016-097768

(51) Int. Cl.
*C10J 3/52* (2006.01)
*F23J 1/08* (2006.01)

(52) U.S. Cl.
CPC ................ *C10J 3/526* (2013.01); *F23J 1/08* (2013.01); *C10J 2300/1628* (2013.01); *F23J 2700/002* (2013.01)

(58) Field of Classification Search
CPC ................ C10J 3/526; C10J 2300/1628; F23J 2700/00–003; F23J 1/00–08
See application file for complete search history.

(56) References Cited

U.S. PATENT DOCUMENTS 4,453,476 A * 6/1984 Erlandsson ............. F23G 5/446
110/187
4,508,542 A * 4/1985 Langhoff .................. C10J 3/526
110/171

(Continued)

FOREIGN PATENT DOCUMENTS

| CN | 1413927 A | 4/2003 |
| CN | 101182080 A | 5/2008 |

(Continued)

OTHER PUBLICATIONS

Ministry of Machinery and Electronics Industry of the People's Republic of China, "Code for design of boiler houses", China Planning Press, Jan. 31, 2003, p. 25; Cited in CN Office Action dated Jun. 3, 2020. (3 pages).

(Continued)

*Primary Examiner* — Matthew J Merkling
(74) *Attorney, Agent, or Firm* — Westerman, Hattori, Daniels & Adrian, LLP (57) ABSTRACT

A slag discharge system includes a slag bath at a bottom portion of a gasifier; a slag cooling water circulation line that discharges a mixture of slag and a slag cooling water from the slag bath; a coarse slag separator device that separates coarse slag contained in the slag cooling water; a fine slag separator device connected to the coarse slag separator device downstream side, the fine slag separator device separating fine slag; and a circulator pump connected to the fine slag separator device downstream side, the circulator pump creating a water flow in the slag cooling water circulation line; wherein the fine slag separator device (Continued)

includes a branch section where the slag cooling water circulation line branches into a plurality of branch lines and again joins together as one line, a fine slag filter portion, and a shutoff valve and disposed in each of the plurality of branch lines.

13 Claims, 5 Drawing Sheets

(56) References Cited

U.S. PATENT DOCUMENTS

| | | | |
|---|---|---|---|
| 5,059,331 A * | 10/1991 | Goyal | B01D 29/66 210/785 |
| 5,251,564 A * | 10/1993 | Rim | F01N 3/02 110/216 |
| 5,336,396 A * | 8/1994 | Shetley | F02D 19/0668 210/90 |
| 7,052,613 B1 * | 5/2006 | Harmless, II | C02F 1/36 210/739 |
| 10,745,632 B2 * | 8/2020 | Koyama | C10J 3/485 |
| 2008/0115479 A1 * | 5/2008 | Tamura | C10K 1/101 60/39.12 |
| 2010/0288711 A1 * | 11/2010 | Kowoll | C10J 3/52 210/774 |
| 2011/0147288 A1 * | 6/2011 | Mihlbauer | A01K 63/045 210/167.21 |
| 2011/0154736 A1 * | 6/2011 | Hanrott | C10J 3/526 48/78 |
| 2013/0183204 A1 * | 7/2013 | Benipal | B01D 3/06 422/187 |
| 2014/0237986 A1 | 8/2014 | Tazawa et al. | |
| 2016/0377094 A1 * | 12/2016 | Choi | F04B 23/04 210/798 |

FOREIGN PATENT DOCUMENTS

| | | |
|---|---|---|
| CN | 102071064 A | 5/2011 |
| CN | 103764803 A | 4/2014 |
| CN | 104162535 A | 11/2014 |
| CN | 104338372 A | 2/2015 |
| CN | 105230448 A | 1/2016 |
| JP | 57-111311 U | 7/1982 |
| JP | 2001-214178 A | 8/2001 |
| JP | 2002-219417 A | 8/2002 |
| JP | 2005-347575 A | 12/2005 |
| JP | 2013-56972 A | 3/2013 |
| JP | 2015-017591 A | 1/2015 |
| JP | 2015-025091 A | 2/2015 |

OTHER PUBLICATIONS

Office Action dated Jun. 3, 2020, issued in counterpart CN Application No. 201780026525.4, with English Translation. (29 pages).
International Search Report dated May 9, 2017, issued in counterpart International Application No. PCT/JP2017/012830, with English translation. (5 pages).
Written Opinion dated May 9, 2017, issued in counterpart International Application No. PCT/JP2017/012830, with English translation. (10 pages).
Zou Zheng Yu, "CANDU-6 Nuclear power plant system and operation. Conventional island system", p. 165; Cited in CN Office Action dated May 27, 2021 (2 pages).
Office Action dated May 27, 2021, issued in counterpart CN Application No. 201780026525.4, with English Translation. (19 pages).

* cited by examiner

SLAG DISCHARGE SYSTEM, GASIFIER, AND SLAG FILTRATION METHOD

TECHNICAL FIELD

The present invention relates to a slag discharge system for a gasifier that gasifies via pyrolysis a carbonaceous feedstock such as coal, a gasifier provided with this slag discharge system, and a slag filtration method.

BACKGROUND ART

In a gasifier that produces combustible gas via pyrolysis of a carbonaceous feedstock such as coal, a biomass fuel such as wood pellets, and petcoke, the ash from the carbonaceous feedstock melts into a slag that accumulates in a slag bath provided at the bottom portion of the gasifier. The slag bath stores slag cooling water, and the slag is dropped into this slag cooling water where it rapidly cools causing solidification and fracturing.

The slag solidified and fractured in this manner collects in the slag bath and is discharged together with the slag cooling water from a slag cooling water circulation line connected to the bottom portion of the slag bath. After the slag is filtered via a predetermined filter, the slag cooling water is passed through a cooler and cooled, then pressured by a circulator pump and circulated back to the slag bath.

The gasifier described in Patent Document 1 has a configuration in which a slag cooling water (slag slurry) including fractured slag discharged from the bottom portion of the gasifier is sequentially passed through a first wet cyclone and a second wet cyclone serially connected to a slag discharge tube (slag cooling water circulation line), and coarse slag is mainly removed at the first wet cyclone and finer slag is removed at the second wet cyclone.

CITATION LIST

Patent Document

Patent Document 1: JP 2001-214178 A

SUMMARY OF INVENTION

Problems to be Solved by the Invention

However, as described in Patent Document 1, because the two wet cyclones are serially connected, when maintenance is performed on one of the wet cyclones, for example, the operation of the entire gasification plant needs to be shut down. This lowers the operating ratio of the gasification plant.

The wet cyclone can remove coarse slag with a particle size of approximately 100 μm or greater (the target particle size can be adjusted depending on the design conditions of the cyclone), but fine slag of 100 μm or less is difficult to be removed. The unremoved fine slag is continually circulated together with the slag cooling water and becomes concentrated, causing a concern for the progression of wear of equipment such as the circulator pump and the cooler and the slag cooling water system.

A high-performance filter such as a polymer filter can be provided in the slag discharge tube to effectively remove fine slag. However, the pressure in the gasifier also acts on the inside the slag discharge tube. A high-performance filter exposed to this pressure would likely suffer in terms of durability and the like. Thus, to-date, technology for providing a high-performance filter in a slag discharge tube has not been achieved.

To solve the problems described above, an object of the present invention is to provide a slag discharge system, a gasifier, and a slag filtration method that can effectively remove fine slag contained in slag cooling water and allows maintenance to be carried out on a slag separator device without lowering the operating ratio of the gasification plant.

Solution to Problems

To solve the above-described problem, the present invention provides the following means.

A slag discharge system according to a first aspect of the present invention includes a slag bath disposed at a bottom portion of a gasifier that gasifies via pyrolysis a carbonaceous feedstock, the slag bath receiving slag produced from the carbonaceous feedstock and storing a slag cooling water for rapidly cooling and fragmenting the slag, a slag cooling water circulation line that removes a mixture of fragmented slag and the slag cooling water from the bottom portion of the slag bath and circulates the slag cooling water with the slag removed to the slag bath, a coarse slag separator device connected in the slag cooling water circulation line, the coarse slag separator device separating coarse slag contained in the slag cooling water, a fine slag separator device connected to the coarse slag separator device downstream side, the fine slag separator device separating fine slag contained in the slag cooling water, and a circulator pump connected to the fine slag separator device downstream side, the circulator pump creating a water flow in the slag cooling water circulation line for pumping out a mixture of the slag and the slag cooling water from the slag bath, wherein the fine slag separator device includes a branch section where the slag cooling water circulation line branches into a plurality of branch lines and again joins together as one line, a fine slag filter portion disposed in at least one of the plurality of branch lines that constitute the branch section, and a shutoff valve disposed in each of the plurality of branch lines that constitute the branch section.

According to the slag discharge system with the above-described configuration, the coarse slag separator device and the fine slag separator device are connected to the slag cooling water circulation line that extends from the slag bath. This allows coarse slag and fine slag to be removed from the slag cooling water, thus suppressing the progression of wear of the slag cooling water system caused by the concentration of fine slag.

The fine slag separator device includes the branch section in which the slag cooling water circulation line branches into the plurality of branch lines, the fine slag filter portion disposed in at least one of the branch lines that constitute the branch section, and the shutoff valves disposed in each of the branch lines that constitute the branch section.

In this configuration, when all of the branch lines that constitute the branch section are provided with a fine slag filter portion, opening the shutoff valves of each of the branch lines allows the slag cooling water to pass through all of the fine slag filter portions and be filtered.

When maintenance involving replacing one of the fine slag filter portions is performed, only the shutoff valves of the branch line where the fine slag filter portion to be maintained is disposed are closed, and the shutoff valves of another branch line is opened. This allows maintenance to be performed with another fine slag filter portion in operation.

Thus, maintenance of the fine slag separator device can be performed without lowering the operating ratio of the gasification plant.

In the slag discharge system with the above-described configuration, in the fine slag separator device, at least one of the plurality of branch lines that constitute the branch section may be a bypass flow channel on which the fine slag filter portion is not disposed, and the fine slag filter portion may be disposed in the plurality of branch lines other than the bypass flow channel.

According to this configuration, when the concentration of fine slag contained in the slag cooling water is lower and filtration is not greatly required, the shutoff valve of the branch line corresponding to the bypass flow channel is opened, and the shutoff valves of the other branch lines provided with the fine slag filter portions are closed. This allows the slag cooling water to pass through without operating the fine slag filter portion, which extends the replacement cycle of the fine slag filter portion, and increase maintainability.

By appropriately adjust the degree of opening of the shutoff valve of the branch line corresponding to the bypass flow channel, the flow rate of the slag cooling water through the fine slag filter portions provided on the other branch lines can be adjusted, and the pressure loss due to the fine slag filter portions can be reduced and the slag cooling water can be continuously partially filtered while preventing concentration of fine slag.

In the slag discharge system with the above-described configuration, in the fine slag separator device, a plurality of the fine slag separator devices may be serially connected in at least one of the plurality of branch lines that constitute the branch section.

Alternatively, in the fine slag separator device, in addition to the fine slag filter portion disposed in the branch section, a fine slag filter portion distinct from the fine slag filter portion may be disposed serially connected the branch section.

According to the above-described configurations, a plurality of the fine slag filter portions are serially connected, allowing fine slag that is not removed at the coarse slag separator device to be removed in plural stages. Accordingly, compared to a configuration in which the fine slag filter portion is connected in one stage, the load on the fine slag filter portions can be decreased and maintainability can be increased. Additionally, by removing the fine slag in plural stages, a suitable filter can be selected for each stage and the range of applicable devices can be increased.

A slag discharge system according to a second aspect of the present invention includes a slag bath disposed at a bottom portion of a gasifier that gasifies via pyrolysis a carbonaceous feedstock, the slag bath receiving slag produced from the carbonaceous feedstock and storing a slag cooling water for rapidly cooling and fragmenting the slag, a slag cooling water circulation line that removes a mixture of fragmented slag and the slag cooling water from the bottom portion of the slag bath and circulates the slag cooling water with the slag removed to the slag bath, a coarse slag separator device connected in the slag cooling water circulation line, the coarse slag separator device separating coarse slag contained in the slag cooling water, a fine slag separator device connected to the coarse slag separator device downstream side, the fine slag separator device separating fine slag contained in the slag cooling water, and a circulator pump connected to the fine slag separator device downstream side, the circulator pump creating a water flow in the slag cooling water circulation line for pumping out a mixture of the slag and the slag cooling water from the slag bath, wherein a normal pressure line is connected to the slag cooling water circulation line, the normal pressure line branching from the slag cooling water circulation line at a branching point between the coarse slag separator device and the circulator pump and again joining the slag cooling water circulation line at a joining point between the branching point and the circulator pump, and in order from the branching point, a pressure reducing portion that reduces pressure coming into from the slag cooling water circulation line to a normal pressure, the fine slag separator device, and a pressure increasing portion that again increases pressure reduced by the pressure reducing portion are disposed in the normal pressure line.

According to this configuration, the normal pressure line branches from the slag cooling water circulation line, and pressure of inside the gasifier does not act in the section of the normal pressure line between the pressure reducing portion and the pressure increasing portion, allowing normal pressure to be maintained in this section. Additionally, because the fine slag separator device is connected in this section where normal pressure is maintained, pressure significantly greater than normal pressure does not act on the fine slag separator device. Thus, a high-performance filter such as a polymer filter can be employed at the fine slag filter portion of the fine slag separator device without concern that the durability and the like of the high-performance filter will suffer. This allows fine slag to be effectively removed.

In the slag discharge system with the above-described configuration, a gravity filter portion may be connected to the normal pressure line between the pressure reducing portion and the fine slag separator device.

According to this configuration, the gravity filter portion is disposed upstream side from the fine slag separator device that operates under normal pressure. Thus, the slag with large particle sizes are mostly removed by the gravity filter portion. This reduces the load of the fine slag separator device located downstream side from the gravity filter portion, allowing maintainability to be improved.

A gasifier according to a third aspect of the present invention includes the slag discharge system according to any one of the aspects described above. According to this gasifier, the actions and effects described above can be achieved.

A slag filtration method according to a fourth aspect of the present invention includes:

discharging a slag cooling water stored in the slag bath together with a slag produce from the carbonaceous feedstock that falls into the slag cooling water, from a bottom portion of a slag bath disposed at a bottom portion of a gasifier that gasifies via pyrolysis a carbonaceous feedstock, performing first filtration to separate coarse slag contained in the slag cooling water, then circulating the slag cooling water towards the slag bath, extracting at least a portion of the slag cooling water after first filtration, reducing pressure of the at least a portion of the slag cooling water being extracted from a pressure of inside the gasifier to a normal pressure, then performing second filtration to separate fine slag contained in the slag cooling water, and increasing pressure of the slag cooling water after second filtration back to the pressure of inside the gasifier, then joining the slag cooling water after second filtration back to the slag cooling water after first filtration.

According to this slag filtration method, when the second filtration is performed to separate the fine slag from the slag cooling water, the fine slag filter portion that separates the fine slag operates under maintained normal pressure. Thus, pressure significantly greater than normal pressure does not act on the fine slag separator device. Thus, a high-performance filter such as a polymer filter can be employed at the fine slag filter portion without concern that the durability and the like of the high-performance filter will suffer. This allows fine slag to be effectively removed.

Advantageous Effect of Invention

As described above, a slag discharge system, a gasifier, and a slag filtration method according to an aspect of the present invention can effectively remove fine slag contained in slag cooling water and allow maintenance to be carried out on the slag separator devices without lowering the operating ratio of the gasification plant.

DESCRIPTION OF EMBODIMENTS

Embodiments of the present invention will be described below with reference to the drawings.

First Embodiment

Figure 1:
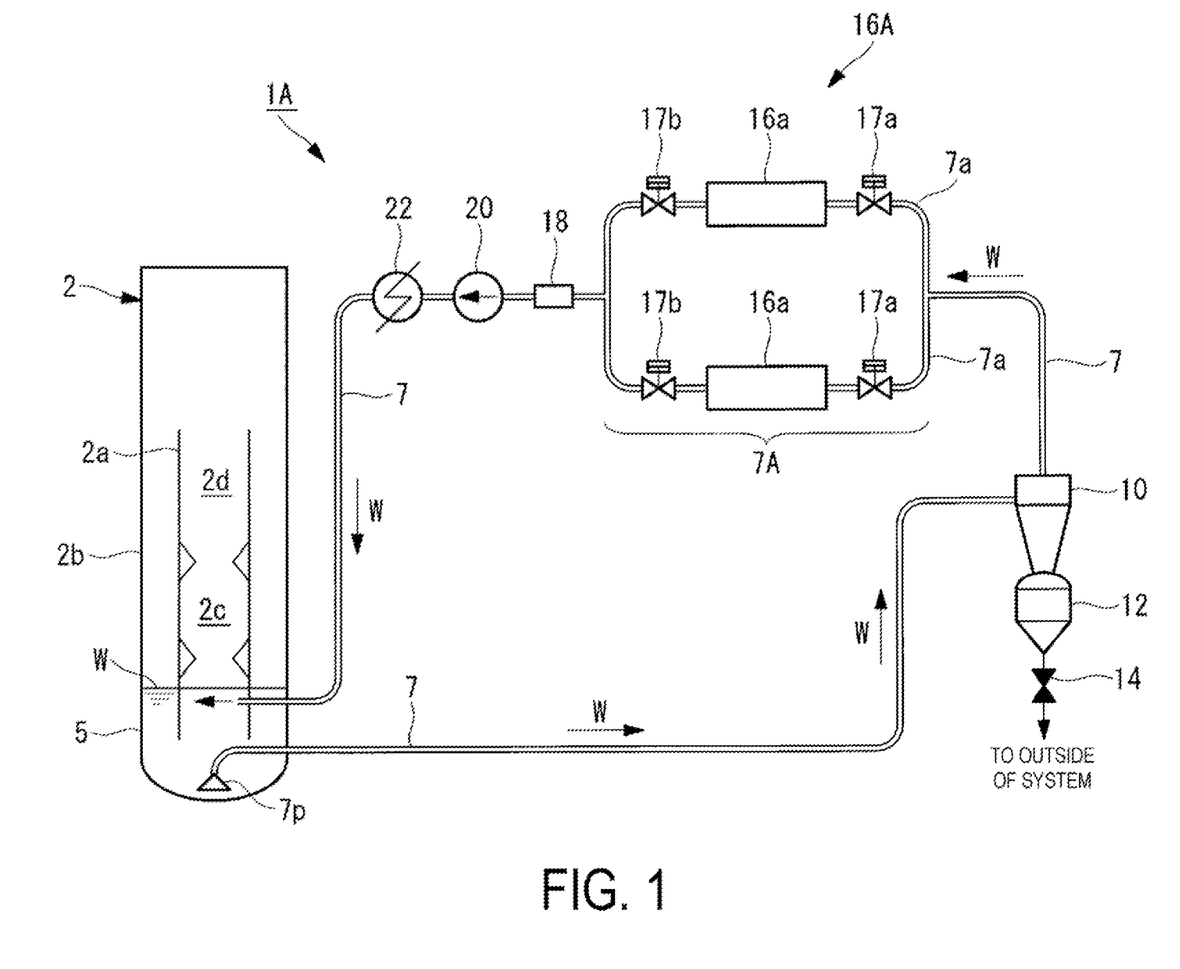
FIG. 1 is a schematic configuration diagram of a gasifier and a slag discharge system according to a first embodiment of the present invention.

FIG. 1 is a schematic configuration diagram of a gasifier and a slag discharge system according to the first embodiment of the present invention. A slag discharge system 1A is used in an integrated gasification combined cycle (IGCC) plant, for example, and provided in a gasifier 2. The gasifier 2 gasifies the pulverized coal made of coal (carbonaceous feedstock) pulverized by a mill or the like by feeding and pyrolyzing it together with a gasification agent such as air or oxygen into the gasifier 2. Note that the raw material for the gasifier is not limited to coal. For example, a gasifier configured to gasify other carbonaceous feedstock such as thinned wood, waste wood, driftwood, grass, waste, sludge, old tires, and other biomass fuel can be alternatively selected.

The gasifier 2 is a pressurized entrained flow gasifier and includes an inner vessel 2a and an outer vessel 2b surrounding the inner vessel 2a. In the inner vessel 2a, a combustor 2c, where some of the pulverized coal is combusted to obtain the heat needed for a gasification reaction, and a reductor 2d, where the heat obtained from the combustor 2c is utilized to gasify the pulverized coal, are disposed in an upper and lower vertical arrangement.

A slag bath 5 is disposed at a bottom portion of the gasifier 2, and slag cooling water W is stored inside the slag bath 5. The ash contained in the pulverized coal fed to the gasifier 2 melts at the combustor 2c, then, as a liquid molten slag, falls by gravity through a slag hole (not illustrated) in a lower portion of the combustor 2c into the slag cooling water W of the slag bath 5, where the liquid molten slag is rapidly cooled, causing solidification and fracturing, then being discharged out of the system of the gasifier 2 by the slag discharge system 1A. The slag discharge system 1A is configured as follows.

A slag cooling water circulation line 7 is connected to the slag bath 5. The slag cooling water circulation line 7 is a line for the discharge of the fractured slag coming from the bottom portion of the slag bath 5. An upstream end of the slag cooling water circulation line 7 corresponds to an intake 7p, and is vertically separated from the bottom portion of the slag bath 5, opening vertically downward. A slag slurry made of a mixture of slag and the slag cooling water W contained in the slag bath 5 is pumped out via the intake 7p. A pressure roughly equivalent to an operation pressure of the gasifier 2 (approximately from 3 to 4 Mpa) also acts on the insides of the slag cooling water circulation line 7.

A coarse slag separator device 10 is connected in the slag cooling water circulation line 7. The coarse slag separator device 10 separates out coarse slag with a relatively larger particle size (for example, approximately 100 μm or greater) from the slag slurry flowing through the slag cooling water circulation line 7. As the separator device, a centrifugal separator device (hydrocyclone and the like) is preferable used, and a strainer, filter, or other filter separator may further be used. The slag slurry is transferred to the coarse slag separator device 10 via the water flow flowing through the slag cooling water circulation line 7.

A lock hopper 12 and a discharge valve 14 are connected to a lower portion of the coarse slag separator device 10. The lock hopper 12 is a hopper that stores a predetermined amount of slag separated from the slag cooling water W at the coarse slag separator device 10, where the discharge valve 14 periodically opens for emptying the slag. The emptied out slag is transported out from the system of the gasifier 2 via a transport vehicle or the like (not illustrated).

A fine slag separator device 16A is connected to the coarse slag separator device 10 downstream side. The fine slag separator device 16A is a filter device that filters and collects fine slag with a particle size of approximately less 100 μm that cannot be removed by the coarse slag separator device 10. Furthermore, a strainer 18, a circulator pump 20, and a cooler 22 are connected in the described order downstream side from the fine slag separator device 16A. The downstream end of the slag cooling water circulation line 7 is connected to the slag bath 5 at a height corresponding to a shallow layer of the slag cooling water W in the slag bath 5. The strainer 18 is provided not for the purpose of filtering coarse slag or fine slag, but, for example, for preventing damage to the circulator pump 20 due to the circulator pump 20 intaking a foreign substance mixed in with the slag cooling water circulation line 7.

Activating the circulator pump 20 creates a water flow in the slag cooling water circulation line 7 from the slag bath 5 toward the coarse slag separator device 10. Accordingly, the slag slurry is pumped out via the intake 7p of the slag cooling water circulation line 7, and the slag slurry then passes through the coarse slag separator device 10 and the fine slag separator device 16A. This removes coarse slag and fine slag, effectively filtering the slag slurry so that only the slag cooling water W remains. Then the filtered slag cooling water W is cooled to a predetermined temperature at the cooler 22 before being circulated back to the slag bath 5.

The fine slag separator device 16A includes a branch section 7A in which the slag cooling water circulation line 7 branches into a plurality of branch lines 7a and again joins together as one line, a fine slag filter portion 16a disposed in the plurality of branch lines 7a of the branch section 7A, and shutoff valves 17a and 17b respectively disposed on upstream side and downstream side of the fine slag filter portions 16a. A typical example of the fine slag filter portion 16a is a polymer filter, but other filters, electrostatic filters, and the like may be used.

In the present embodiment, the number of branch lines 7a is two, and the fine slag filter portion 16a is disposed in each of the two branch lines 7a. However, three or more branch lines 7a and fine slag filter portions 16a can be provided. Additionally, the branch line 7a may not be provided with the fine slag filter portion 16a. In such a configuration, the two shutoff valves 17a and 17b are not disposed in the branch line 7a, and only one shutoff valve is provided.

The shutoff valves 17a and 17b may be simple gate valves or may be valves that can regulate the flow rate. Additionally, the shutoff valves 17a and 17b may be, for example, opened and closed electrically or may be opened and closed by hand.

According to the slag discharge system 1A configured as such, the coarse slag separator device 10 and the fine slag separator device 16A are connected in the slag cooling water circulation line 7 that extends from the slag bath 5. This allows coarse slag and fine slag to be removed from the slag cooling water W flowing through the slag cooling water circulation line 7. Thus, the progression of wear of the slag cooling water system due to fine slag concentration can be suppressed. The concentration of fine slag may be measured using a turbidimeter or via sampling.

The fine slag separator device 16A includes the branch section 7A in which the slag cooling water circulation line 7 branches into the plurality of branch lines 7a, the fine slag filter portion 16a disposed in each of the branch lines 7a that constitute the branch section 7A, and the shutoff valves 17a and 17b respectively disposed on upstream side and downstream side of the fine slag filter portions 16a in the branch lines 7a.

In a configuration in which all of the branch lines 7a that constitute the branch section 7A are provided with a fine slag filter portion 16a, when the shutoff valves 17a and 17b of each of the branch lines 7a are opened, the slag cooling water W can pass through all of the fine slag filter portions 16a and be filtered.

When maintenance involving replacing one of the fine slag filter portions 16a is performed, only the shutoff valves 17a and 17b of the branch line 7a where the fine slag filter portion 16a to be replaced is disposed are closed, and the shutoff valves 17a and 17b of other branch lines 7a are opened. This allows maintenance to be performed with other fine slag filter portions 16a in operation. Thus, maintenance of the fine slag separator device 16A can be performed without lowering the operating ratio of the gasification plant.

By increasing the number of branch lines 7a that constitute the branch section 7A and the number of fine slag filter portions 16a, the filtration area through which the slag cooling water W passes can be increased, the pressure loss can be decreased, and the circulation amount of the slag cooling water W can be increased.

Second Embodiment

Figure 2:
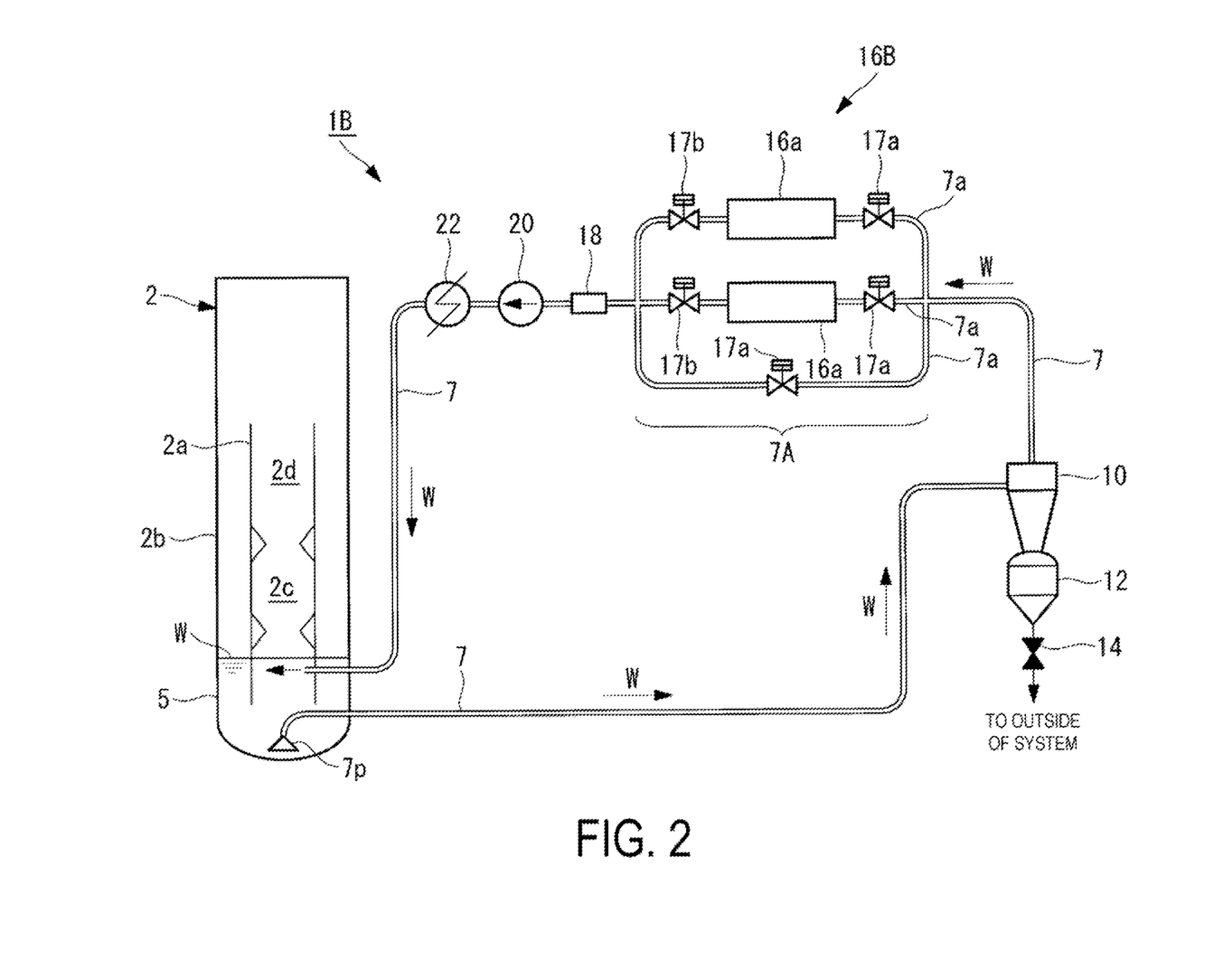
FIG. 2 is a schematic configuration diagram of a gasifier and a slag discharge system according to a second embodiment of the present invention.

FIG. 2 is a schematic configuration diagram of the gasifier 2 and a slag discharge system 1B according to the second embodiment of the present invention. In the slag discharge system 1B, the configuration of a fine slag separator device 16B is different from that of the fine slag separator device 16A of the first embodiment. Other configurations are the same, and thus components which are the same are denoted with the same reference sign and descriptions thereof are omitted.

The fine slag separator device 16B includes three branch lines 7a, for example, and the fine slag filter portions 16a are disposed in two of the branch lines 7a. Another one of the branch lines 7a is not provided with a fine slag filter portion 16a. The shutoff valves 17a and 17b are respectively disposed on upstream side and downstream side of the two fine slag filter portions 16a. The branch line 7a without a fine slag filter portion 16a corresponds to a bypass flow channel and is provided with one shutoff valve 17a.

According to the slag discharge system 1B, when the concentration of fine slag contained in the slag cooling water W is lower and filtration is not greatly required, the shutoff valve 17a of the branch line 7a corresponding to the bypass flow channel is opened, and the shutoff valves 17a and 17b of the other branch lines 7a provided with the fine slag filter portions 16a are closed. By allowing the slag cooling water W to flow through only the bypass flow channel and not through the fine slag filter portions 16a, the slag cooling water W can be passed through without the operation of the fine slag filter portions 16a. This extends the replacement cycle of the fine slag filter portion 16a, and increase maintainability.

For example, by appropriately adjust the degree of opening of the shutoff valve 17a of the branch line 7a corresponding to the bypass flow channel, the flow rate of the slag cooling water W through the fine slag filter portions 16a provided on the other branch lines 7a can be adjusted, and the pressure loss due to the fine slag filter portions 16a can be reduced and the slag cooling water W can be continuously partially filtered while preventing concentration of fine slag.

Third Embodiment

Figure 3:
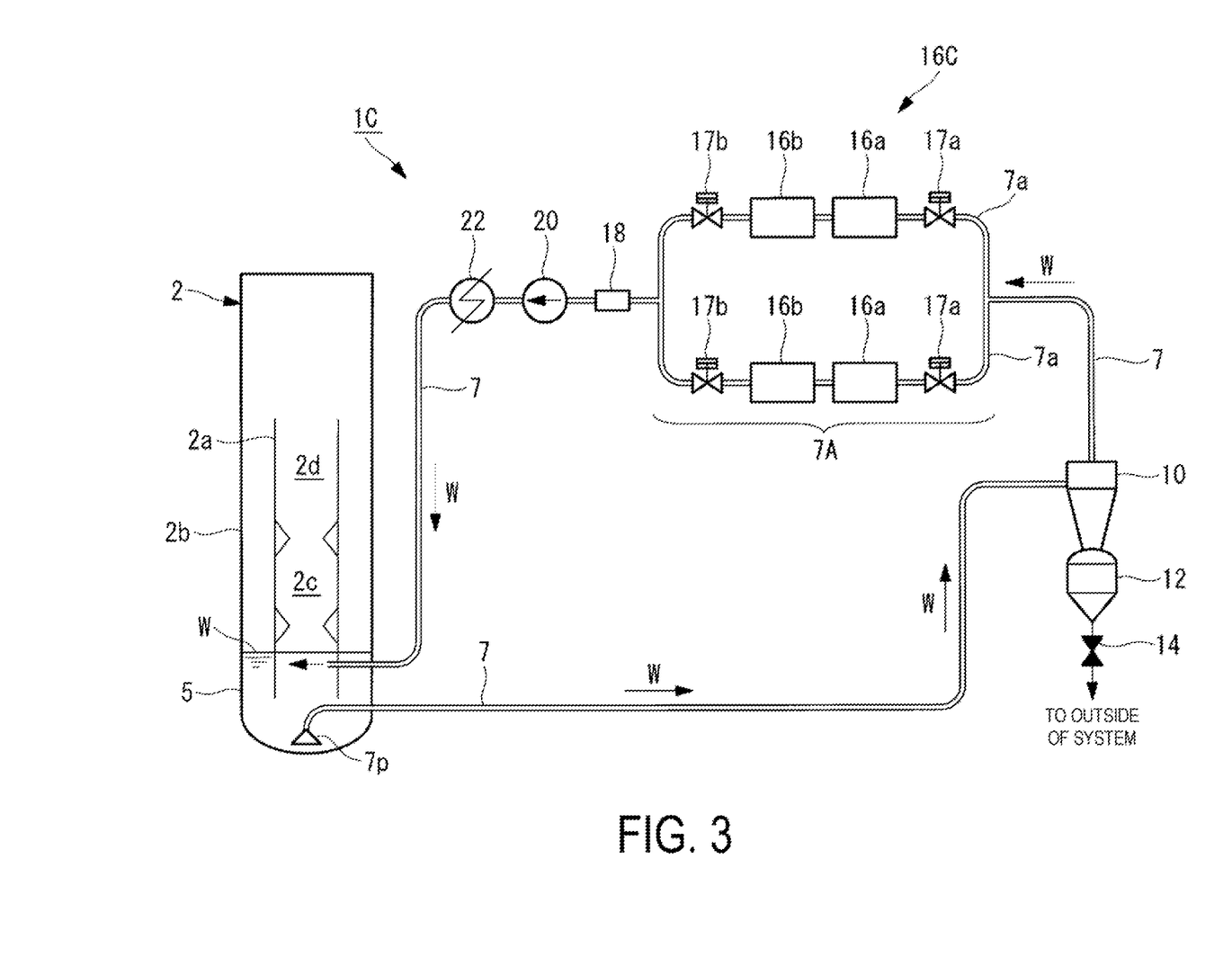
FIG. 3 is a schematic configuration diagram of a gasifier and a slag discharge system according to a third embodiment of the present invention.

FIG. 3 is a schematic configuration diagram of the gasifier 2 and a slag discharge system 1C according to the third embodiment of the present invention. In the slag discharge system 1C, the configuration of a fine slag separator device 16C is different from that of the fine slag separator device 16A of the first embodiment. Other configurations are the same, and thus components which are the same are denoted with the same reference sign and descriptions thereof are omitted.

The fine slag separator device 16C has a similar configuration to the fine slag separator device 16A of the first embodiment, except that a plurality of fine slag filter portions 16a and 16b are serially connected in at least one branch line 7a of the plurality of branch lines 7a (for example, two) that constitute the branch section 7A. Three or more fine slag filter portions 16a and 16b may be connected. The downstream side fine slag filter portion 16b can collect fine slag of a smaller particle size than that collected by the upstream side fine slag filter portion 16a. In other words, the fine slag filter portion 16b removes fine slag with a small particle size that is not removed at the fine slag filter portion 16a.

According to the above-described configuration, the plurality of fine slag filter portions 16a and 16b are serially connected in one branch line 7a, allowing fine slag that is not removed at the coarse slag separator device 10 to be removed in plural stages. Accordingly, compared to a configuration in which the fine slag filter portions are connected in one stage, the load on the fine slag filter portions 16a and 16b can be decreased and maintainability can be increased. Additionally, by removing the fine slag in plural stages, a suitable filter can be selected for each stage and the range of applicable devices can be increased.

Fourth Embodiment

Figure 4:
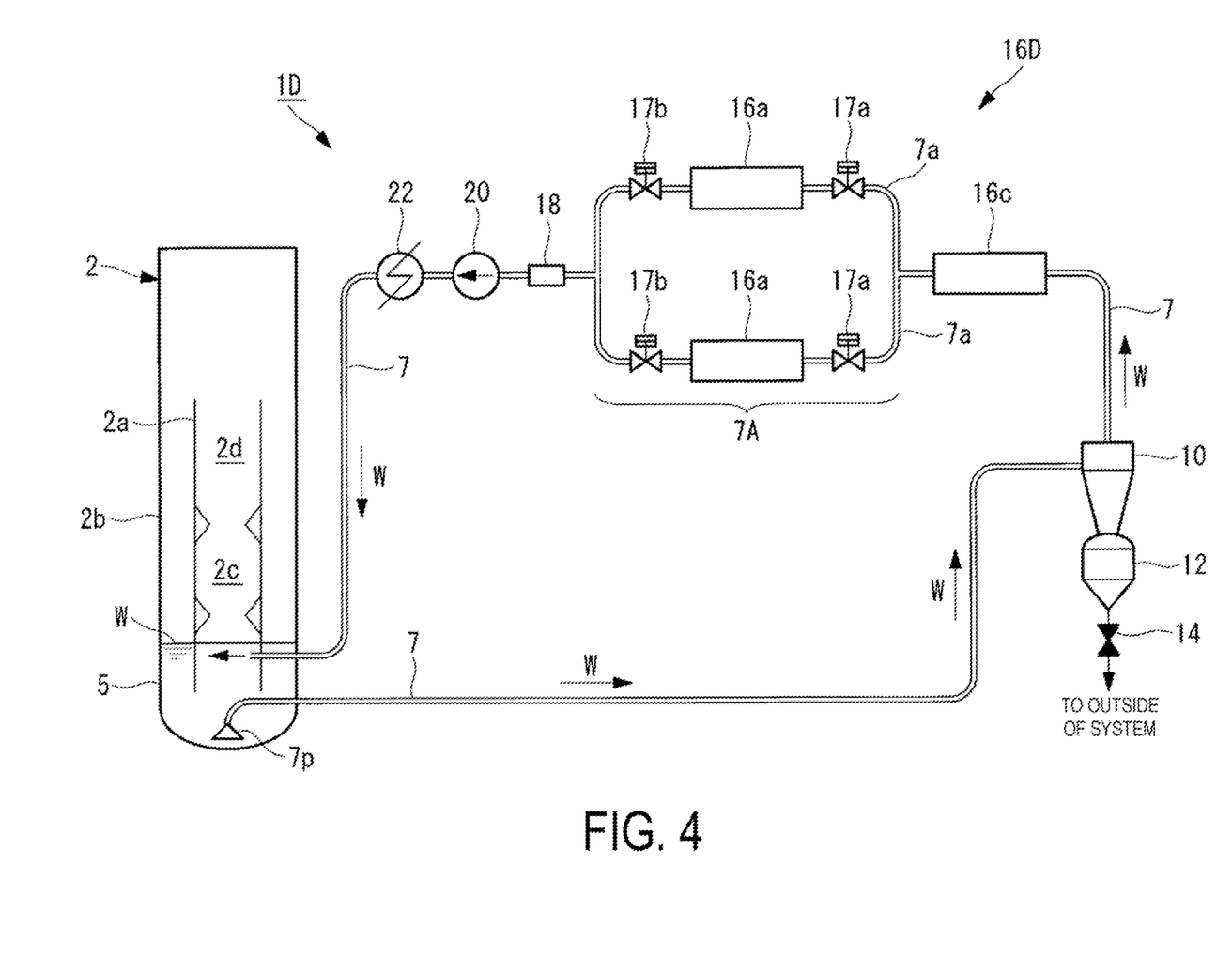
FIG. 4 is a schematic configuration diagram of a gasifier and a slag discharge system according to a fourth embodiment of the present invention.

FIG. 4 is a schematic configuration diagram of the gasifier 2 and a slag discharge system 1D according to the fourth embodiment of the present invention. In the slag discharge system 1D, the configuration of a fine slag separator device 16D is different from that of the fine slag separator device 16A of the first embodiment. Other configurations are the same, and thus components which are the same are denoted with the same reference sign and descriptions thereof are omitted.

The fine slag separator device 16D has a similar configuration to the fine slag separator device 16A of the first embodiment, except that in addition to the fine slag filter portions 16a disposed in the branch section 7A, a fine slag filter portion 16c distinct from the fine slag filter portions 16a is serially connected to the branch section 7A. The fine slag filter portion 16c is configured to catch slag which is coarser and has a larger particle size than the size of the fine slag filter portions 16a is configured, for example, and is connected upstream side from the fine slag filter portions 16a. The fine slag filter portion 16c may also be connected downstream side from the fine slag filter portions 16a. In such a configuration, the fine slag filter portion 16c is configured to remove fine slag with a smaller particle size than that removed by the fine slag filter portions 16a.

According to the above-described configuration, the fine slag filter portions 16a and 16c are serially connected, allowing fine slag that is not removed at the coarse slag separator device 10 to be removed in plural stages. Accordingly, compared to a configuration in which the fine slag filter portions are connected in one stage, the load on the fine slag filter portions 16a and 16c can be decreased and maintainability can be increased. Additionally, by removing the fine slag in plural stages, a suitable filter can be selected for each stage and the range of applicable devices can be increased.

Fifth Embodiment

Figure 5:
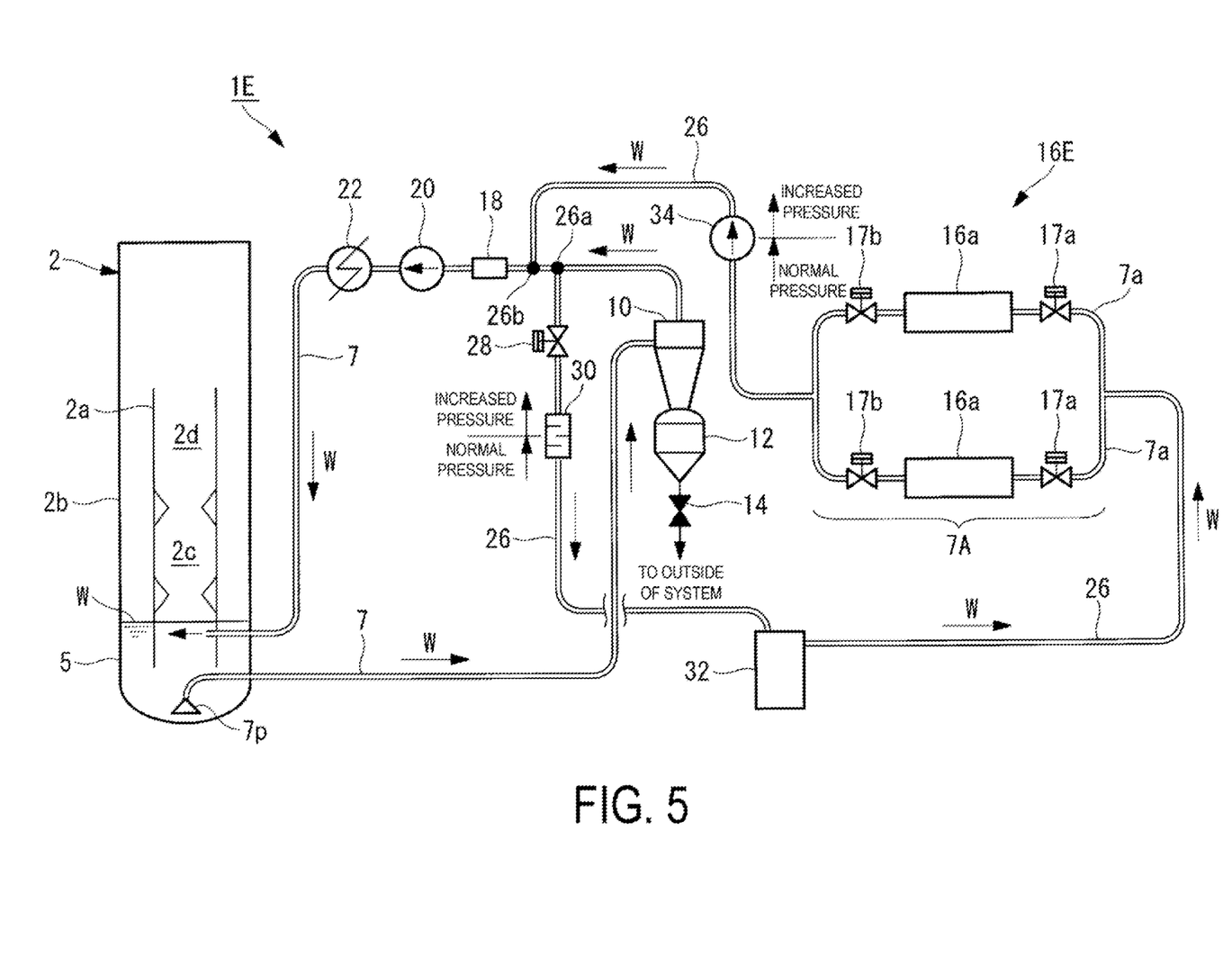
FIG. 5 is a schematic configuration diagram of a gasifier and a slag discharge system according to a fifth embodiment of the present invention.

FIG. 5 is a schematic configuration diagram of the gasifier 2 and a slag discharge system 1E according to the fifth embodiment of the present invention. For the slag discharge system 1E, components with a similar configuration to that of the slag discharge system 1A of the first embodiment are denoted with the same reference sign and descriptions thereof are omitted.

As with the slag discharge systems 1A to 1D of other embodiments, the slag discharge system 1E includes the coarse slag separator device 10 and a fine slag separator device 16E. Where only the coarse slag separator device 10 is serially connected to the slag cooling water circulation line 7 that extends from the slag bath 5 of the gasifier 2 and returns to the slag bath 5. The fine slag separator device 16E is connected to a normal pressure line 26 that branches from the slag cooling water circulation line 7 and again joins the slag cooling water circulation line 7. The slag cooling water W is firstly filtered by the coarse slag separator device 10, and secondly filtered by the fine slag separator device 16E.

The normal pressure line 26 is disposed in a loop-like manner, with the normal pressure line 26 branching from the slag cooling water circulation line 7 at the position of a branching point 26a disposed between the coarse slag separator device 10 and the circulator pump 20 (more precisely, the strainer 18) and joins together with the slag cooling water circulation line 7 again at a joining point 26b disposed between the branching point 26a and the circulator pump 20 (18). In other words, the joining point 26b of the slag cooling water circulation line 7 is located downstream side in the flow direction from the branching point 26a.

In order from the branching point 26a, a shutoff valve 28, a pressure reducing portion 30, a gravity filter portion 32, the fine slag separator device 16E, and a pressure increasing portion 34 are connected to the normal pressure line 26. A typical example of the pressure reducing portion 30 is a multistage orifice, but other pressure reducing means may be used. The pressure reducing portion 30 reduces the pressure coming from the gasifier 2 through the slag cooling water circulation line 7 into the normal pressure line 26 to a normal pressure (atmospheric pressure). Note that the shutoff valve 28 may correspond to a flow rate regulating valve and may perform the function as the pressure reducing portion 30 via adjustment of the degree of opening to a smaller degree. A typical example of the gravity filter portion 32 is a slag settling tank.

The fine slag separator device 16E has a similar configuration to the fine slag separator device 16A of the first embodiment (see FIG. 1). The fine slag separator device 16E is connected to the coarse slag separator device 10 downstream side via the normal pressure line 26 and separates the fine slag contained in the slag cooling water W. A typical example of the pressure increasing portion 34 is a circulator pump. The pressure increasing portion 34 increases again the pressure of the slag cooling water W after having its pressure reduced by the pressure reducing portion 30 and circulates the slag cooling water W through the slag cooling water circulation line 7.

In the slag discharge system 1E configured as described above, activating the circulator pump 20 disposed in the slag cooling water circulation line 7 creates a water flow in the slag cooling water circulation line 7 from the slag bath 5 toward the coarse slag separator device 10 side. Accordingly, the slag slurry in the slag bath 5 is pumped out via the intake 7p of the slag cooling water circulation line 7, and the slag slurry then passes through the coarse slag separator device 10 where coarse slag is removed (first filtration).

Operating the pressure increasing portion 34 (circulator pump) with the shutoff valve 28 disposed in the normal pressure line 26 open creates a water flow in the normal pressure line 26 from the branching point 26a to the joining point 26b. As a result, a portion or all of the slag cooling water W flowing through the slag cooling water circulation line 7 after coarse slag removal by the coarse slag separator device 10 is extracted through the normal pressure line 26.

The pressure coming from the gasifier 2 through the slag cooling water circulation line 7 into the normal pressure line 26 is reduced by the pressure reducing portion 30, and the slag cooling water W flowing through the normal pressure line 26 come to be at normal pressure (atmospheric pressure). The slag cooling water W at normal pressure passes through the fine slag separator device 16E, and fine slag is removed (second filtration). Thereafter, the pressure of the slag cooling water W is increased by the pressure increasing portion 34, before the slag cooling water W is circulated again to join the slag cooling water circulation line 7 at the joining point 26b.

According to this configuration, the pressure of inside the gasifier 2 does not act on the section of the normal pressure line 26 between the pressure reducing portion 30 and the pressure increasing portion 34, and pressure significantly greater than normal pressure does not act on the fine slag separator device 16E disposed in this section. Thus, a high-performance filter such as a polymer filter can be employed at the fine slag filter portion 16a of the fine slag separator device 16E without concern that the durability and the like of the high-performance filter will suffer. This allows fine slag to be effectively removed.

On the normal pressure line 26, the gravity filter portion 32 is connected upstream side from the fine slag separator device 16E that operates under normal pressure as described above. Thus, the slag with large particle sizes are mostly removed by the gravity filter portion 32. This reduces the load of the fine slag separator device 16E located downstream side from the gravity filter portion 32, allowing maintainability to be improved.

As described above, the slag discharge systems 1A to 1E according to the first to fifth embodiments, the gasifier 2 including the same, and a slag filtration method can effectively remove fine slag contained in slag cooling water W and allow maintenance to be carried out on the fine slag separator devices 16A to 16E without lowering the operating ratio of the gasification plant. Additionally, the maintenance workability of the fine slag separator devices 16A to 16E can be improved.

Note that the present invention is not limited only to the configuration of the above-described embodiment, and changes and modifications may be made as appropriate. Embodiments having such changes and modifications are included in the scope of claims of the present invention. For example, the order in which the components are connected, the installation position, and the like for the above-described embodiments may be changed as appropriate. Additionally, the above-described configuration can be applied to a gasifier and the like of a chemical plant.

REFERENCE SIGNS LIST 1A, 1B, 1C, 1D Slag discharge system
2 Gasifier
5 Slag bath
7 Slag cooling water circulation line
7A Branch section
7a Branch line
10 Coarse slag separator device
16A, 16B, 16C, 16D Fine slag separator device
16a, 16b Fine slag filter portion
17a, 17b Shutoff valve
20 Circulator pump
26 Normal pressure line
26a Branching point
26b Joining point
30 Pressure reducing portion
32 Gravity filter portion
34 Pressure increasing portion
W Slag cooling water

The invention claimed is:

1. A slag discharge system, comprising:
a slag bath disposed at a bottom portion of a gasifier that gasifies via pyrolysis a carbonaceous feedstock, the slag bath receiving slag produced from the carbonaceous feedstock and storing a slag cooling water for rapidly cooling and fragmenting the slag;
a slag cooling water circulation line that removes a mixture of fragmented slag and the slag cooling water from the bottom portion of the slag bath and circulates the slag cooling water with the slag removed to the slag bath;
a coarse slag separator device connected in the slag cooling water circulation line, the coarse slag separator device separating coarse slag contained in the slag cooling water;
a fine slag separator device connected to the coarse slag separator device downstream side, the fine slag separator device separating fine slag with a particle size of less 100 μm contained in the slag cooling water;
a circulator pump connected to the fine slag separator device downstream side, the circulator pump creating a water flow in the slag cooling water circulation line for pumping out a mixture of the slag and the slag cooling water from the slag bath; and
a strainer provided between the fine slag separator device and the circulator pump, the strainer being provided not for filtering the coarse slag or the fine slag but for preventing the circulator pump from being damaged by intaking a foreign substance mixed in with the slag cooling water circulation line; wherein
the fine slag separator device comprises
a branch section where the slag cooling water circulation line branches into a plurality of branch lines and again joins together as one line;
a fine slag filter portion disposed in at least one of the plurality of branch lines that constitute the branch section; and
a shutoff valve disposed in each of the plurality of branch lines that constitute the branch section.

2. The slag discharge system according to claim 1, wherein in the fine slag separator device, at least one of the plurality of branch lines that constitute the branch section is a bypass flow channel in which the fine slag filter portion is not disposed, and the fine slag filter portion is disposed in the plurality of branch lines other than the bypass flow channel.

3. The slag discharge system according to claim 1, wherein in the fine slag separator device, a plurality of the fine slag separator devices are serially connected in at least one of the plurality of branch lines that constitute the branch section.

4. The slag discharge system according to claim 1, wherein in the fine slag separator device, in addition to the fine slag filter portion disposed in the branch section, a fine slag filter portion distinct from the fine slag filter portion is disposed serially connected the branch section.

5. A slag discharge system, comprising:
a slag bath disposed at a bottom portion of a gasifier that gasifies via pyrolysis a carbonaceous feedstock, the slag bath receiving slag produced from the carbonaceous feedstock and storing a slag cooling water for rapidly cooling and fragmenting the slag;
a slag cooling water circulation line that removes a mixture of fragmented slag and the slag cooling water from the bottom portion of the slag bath and circulates the slag cooling water with the slag removed to the slag bath;
a coarse slag separator device connected in the slag cooling water circulation line, the coarse slag separator device separating coarse slag contained in the slag cooling water;

a fine slag separator device connected to the coarse slag separator device downstream side, the fine slag separator device separating fine slag contained in the slag cooling water; and a circulator pump connected to the fine slag separator device downstream side, the circulator pump creating a water flow in the slag cooling water circulation line for pumping out a mixture of the slag and the slag cooling water from the slag bath; wherein a normal pressure line is connected to the slag cooling water circulation line, the normal pressure line branching from the slag cooling water circulation line at a branching point between the coarse slag separator device and the circulator pump and again joining the slag cooling water circulation line at a joining point between the branching point and the circulator pump, and in order from the branching point, a pressure reducing portion that reduces pressure coming into from the slag cooling water circulation line to a normal pressure, the fine slag separator device, and a pressure increasing portion that again increases pressure reduced by the pressure reducing portion are disposed in the normal pressure line.

6. The slag discharge system according to claim 5, wherein a gravity filter portion is connected to the normal pressure line between the pressure reducing portion and the fine slag separator device.

7. A gasifier comprising the slag discharge system according to claim 1.

8. A slag filtration method, comprising:

discharging a slag cooling water stored in a slag bath together with a slag produced from a carbonaceous feedstock that falls into the slag cooling water, from a bottom portion of the slag bath disposed at a bottom portion of a gasifier that gasifies via pyrolysis the carbonaceous feedstock;

performing first filtration to separate coarse slag contained in the slag cooling water, then circulating the slag cooling water towards the slag bath;

extracting at least a portion of the slag cooling water after first filtration;

reducing pressure of the at least a portion of the slag cooling water being extracted from a pressure of inside the gasifier to a normal pressure, then performing second filtration to separate fine slag contained in the portion of the slag cooling water; and increasing pressure of the portion of the slag cooling water after second filtration back to the pressure of inside the gasifier, then joining the portion of the slag cooling water after second filtration back to the slag cooling water after first filtration.

9. A gasifier comprising the slag discharge system according to claim 2.

10. A gasifier comprising the slag discharge system according to claim 3.

11. A gasifier comprising the slag discharge system according to claim 4.

12. A gasifier comprising the slag discharge system according to claim 5.

13. A gasifier comprising the slag discharge system according to claim 6.

\* \* \* \* \*